United States Patent [19]

Campbell et al.

[11] Patent Number: 5,244,177
[45] Date of Patent: Sep. 14, 1993

[54] HANGER FOR SUSPENDING EQUIPMENT IN A STORAGE TANK

[75] Inventors: Evan Campbell; Kent Reid; Wayne Luzzader, all of Logan, Utah

[73] Assignee: Campbell Scientific, Inc., Logan, Utah

[21] Appl. No.: 725,789

[22] Filed: Jul. 9, 1991

[51] Int. Cl.⁵ ............................................ F16M 13/00
[52] U.S. Cl. .................................. 248/317; 248/655; 248/293
[58] Field of Search ............... 248/317, 542, 286, 284, 248/281.1, 293, 320, 653, 655, 665, 640, 643, 641, 642; 367/173, 165

[56] References Cited

U.S. PATENT DOCUMENTS

| | | | |
|---|---|---|---|
| 2,930,568 | 3/1960 | Rader | 248/317 |
| 3,740,706 | 6/1973 | Joseph | 367/163 |
| 3,948,472 | 4/1976 | Metcalf | 248/642 X |
| 4,367,652 | 1/1983 | Venuso | 73/861 |
| 4,467,648 | 8/1984 | Sasaki | 73/432 R |
| 4,563,896 | 1/1986 | Arnold | 73/290 R |
| 4,667,915 | 5/1987 | Boucher et al. | 248/642 X |
| 4,825,695 | 5/1989 | Ohtani | 73/290 R |
| 4,966,566 | 10/1990 | Baird | 248/642 X |
| 5,014,953 | 5/1991 | Warnan et al. | 248/653 X |

Primary Examiner—Karen J. Chotkowski
Attorney, Agent, or Firm—Wells, St. John, Roberts, Gregory & Matkin

[57] ABSTRACT

A hanger for suspending equipment within an existing liquid storage tank includes a longitudinal channel having one end adapted to be fixed adjacent to the upper end of a receiving riser pipe and a second end adapted to project within the tank. A parallel arm assembly is foldable at the second end of the channel and is movable longitudinally in opposition to biasing springs. The arm assembly engages an interior tank surface at opposite sides of the channel to fix the location from which suspended equipment is hung. This isolates the suspension point for the equipment from dimensional changes that might occur in the channel supporting it along the upright riser pipe.

18 Claims, 4 Drawing Sheets

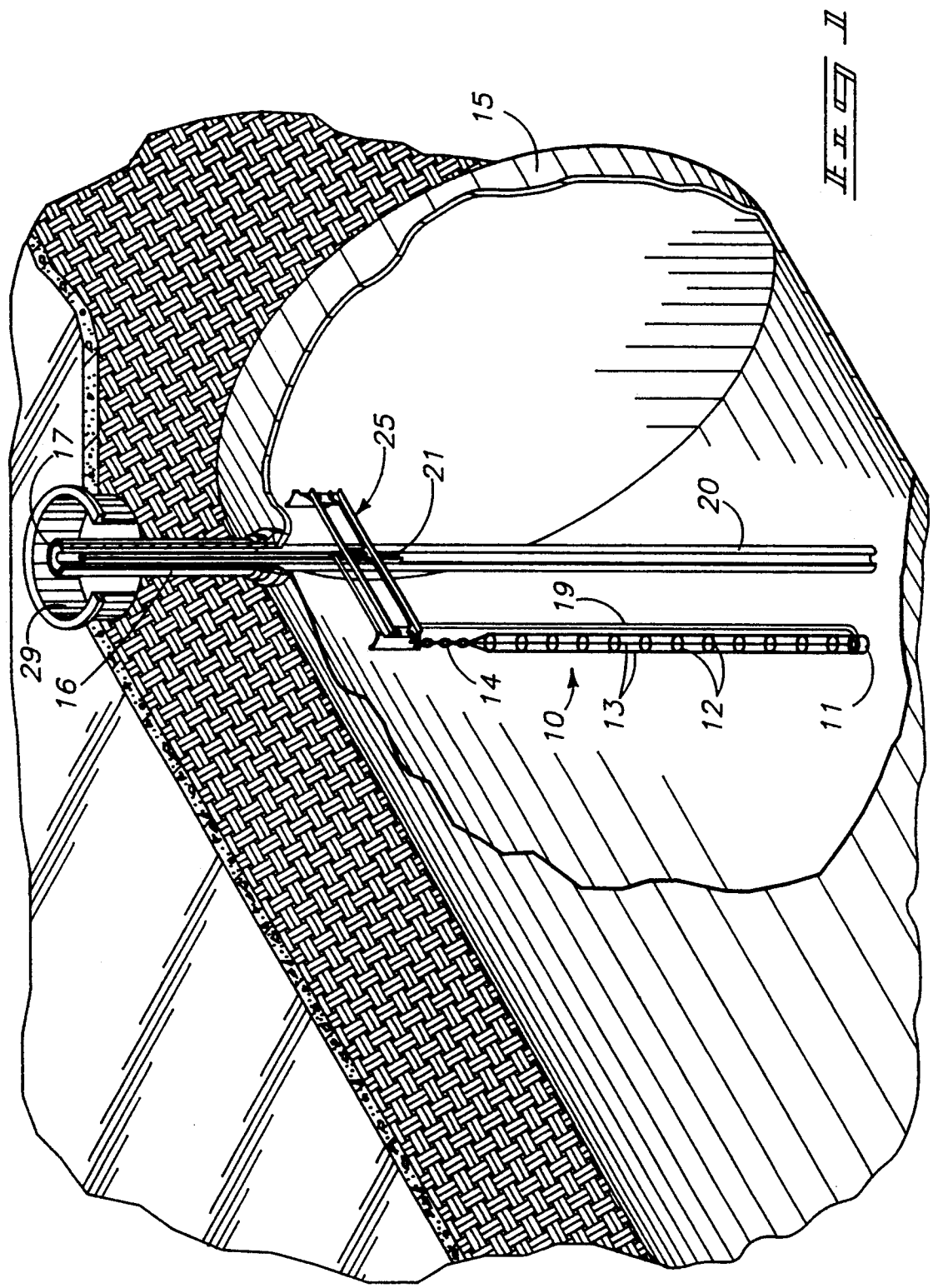

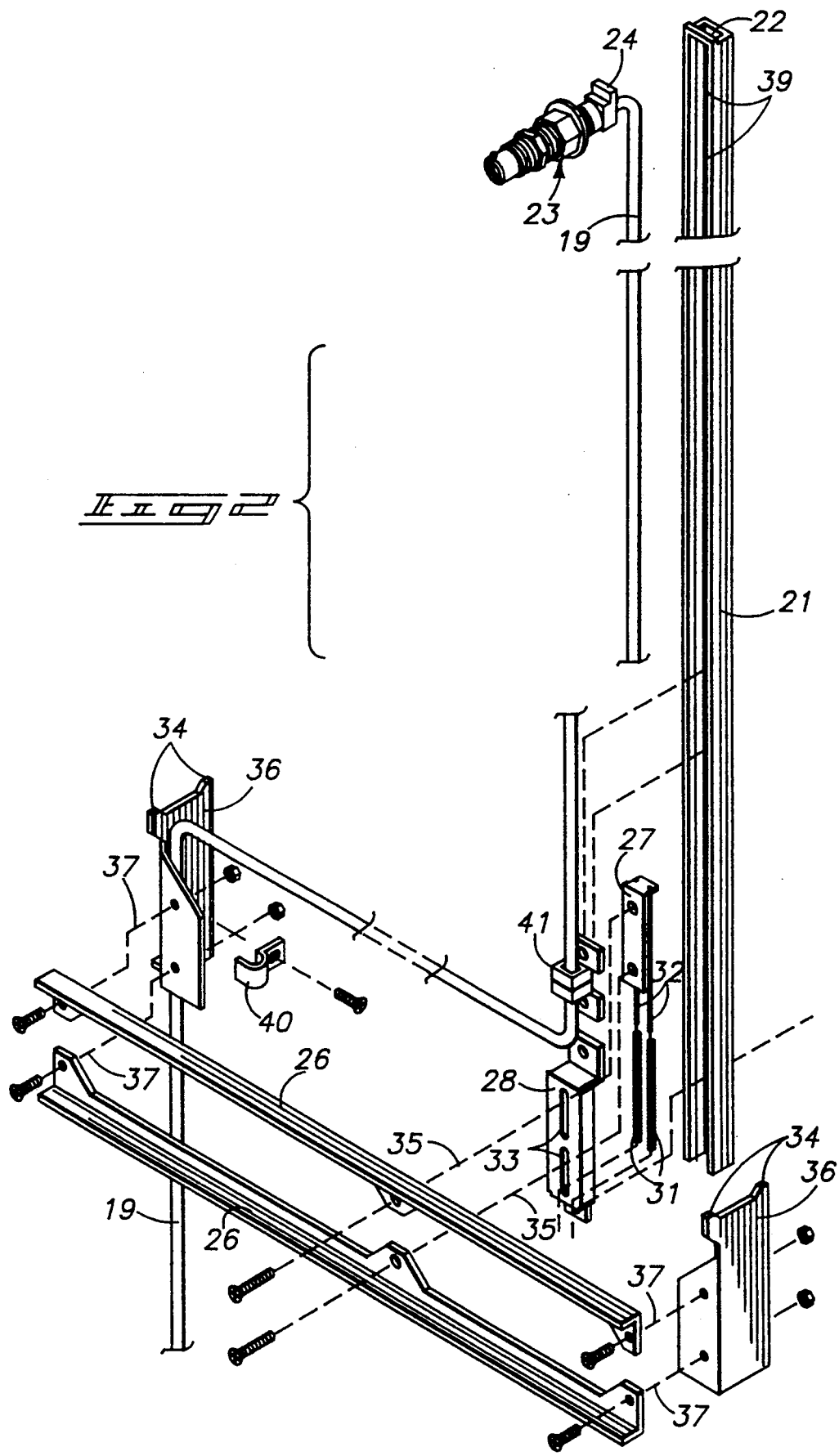

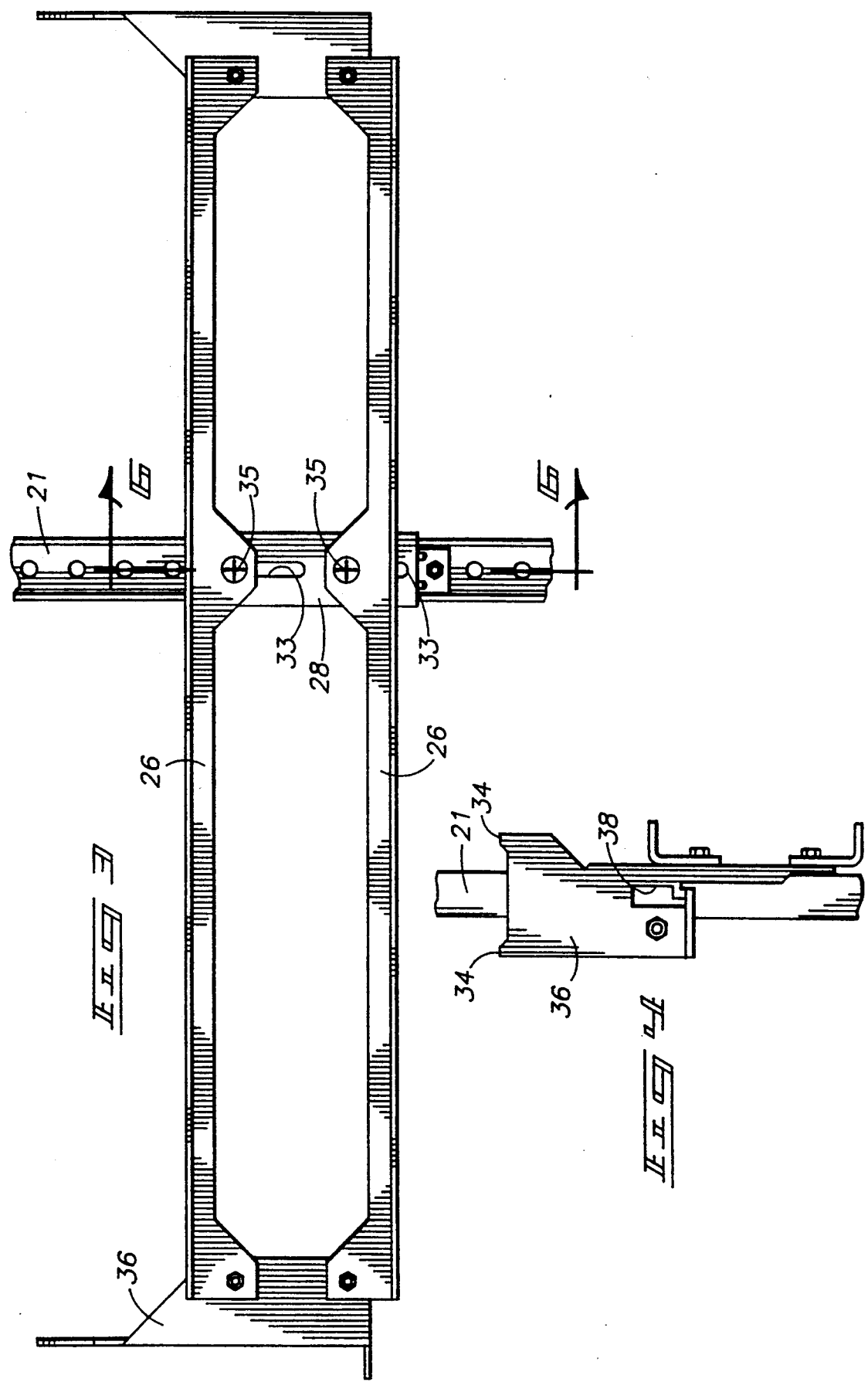

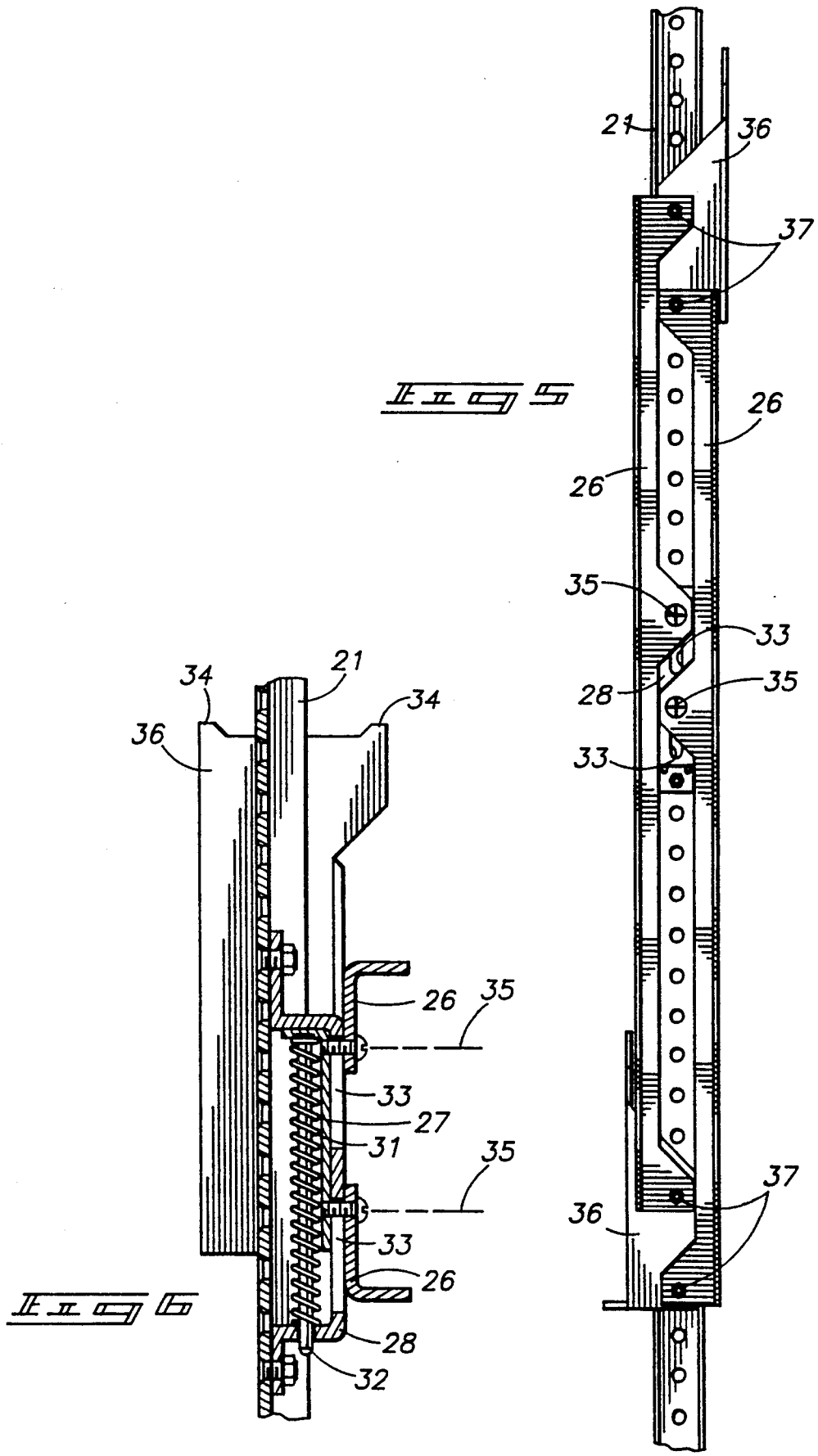

HANGER FOR SUSPENDING EQUIPMENT IN A STORAGE TANK

TECHNICAL FIELD

This disclosure relates to a hanger for vertically suspending equipment, such as a liquid level monitoring probe, within an existing liquid storage tank without excavation or substantial modification of the tank. It can be effectively mounted in the riser pipe included on such tanks for product delivery purposes.

BACKGROUND OF THE INVENTION

Liquid level monitoring probes are utilized today as in-tank monitors for leak detection purposes. By monitoring such leakage, tank operators can reduce financial losses due to lost product and minimize impact on the adjacent environment. Such probe installations provide remote monitoring of changes in the level of product stored within a storage tank. Accurate monitoring of liquid level changes within underground liquid storage tanks is being increasingly required by regulatory agencies concerned with product leakage into the surrounding environment.

A significant number of liquid storage tanks now require retrofit systems for monitoring product leakage. The addition of an in-tank monitor usually requires excavation of an underground tank and addition of a dedicated riser pipe for the monitoring equipment. This results in disruption of business pertaining to the tank during the excavation procedure and concerns for the aesthetics of the surrounding property because excavation normally leaves significant scaring, as well as the possibility of a tank leak arising due to the disturbance involved in excavation.

A typical underground storage tank for liquids, such as gasoline and other oil-based products, is provided with a vertical cylindrical riser pipe used to accept product deliveries. A circular manhole surrounding it provides access to the riser for delivery purposes. A thin wall aluminum "drop tube" minimizes product evaporation during deliveries. The "drop tube" fits within the riser and extends into the tank to a location within several inches from the tank bottom.

It is not practical to simply hang a monitoring probe or other equipment vertically within the existing riser pipe for an underground liquid storage tank. Such placement of suspended equipment within a tank would interfere with the intended purpose of the riser pipe for product delivery needs. Positioning any substantial equipment directly under the riser pipe would also eliminate use of a drop tube, which is now required in the United States by statute.

To accommodate the need for a drop tube within a riser pipe and tank, it is necessary to suspend the hanger for in-tank equipment within the riser pipe closely adjacent to a side wall of the riser pipe, where it will not substantially interfere with placement of a drop tube. The drop tube can then be longitudinally creased to provide clearance for the hanger along the riser pipe.

Monitoring equipment, such as a probe, suspended by a hanger within the tank interior must also be transversely offset from an extension of the supporting riser pipe, so that it does not contact or interfere with the inserted drop tube. This transverse offset of the hanger requires use of a longitudinal rigid member extending through the riser pipe and capable of supporting an offset support for the probe.

In-tank liquid level probes using ultrasonic technology can be extremely accurate. In order to provide consistent readings of liquid level within the tank, it is vital that such probes be maintained in a fixed position with respect to the interior surfaces of the tank.

Early testing of hangers for this type of sensitive monitoring equipment showed degradation of results due to the thermal contraction and expansion of the supporting hanger structure within the riser itself. This was particularly a problem in installations where the risers extended above ground level.

The present invention has been designed to reference the elevation of the equipment relative to the interior of a tank while also isolating the position of the equipment within the tank from dimensional changes in the length of a rigid support member extending along the supporting riser pipe.

The present invention lends itself to retrofitting of underground storage tanks by using an existing riser pipe to suspend equipment, such as an ultrasonic liquid level monitor or probe, within the tank interior. It leaves the riser pipe fully accessible for its conventional purposes (such as product deliveries). The invention also can be applied to new tank installations, where a separate dedicated riser pipe can be provided on the tank without substantial additional expense or environmental disruption.

BRIEF DESCRIPTION OF THE DRAWINGS

One or more preferred embodiments of the invention are illustrated in the accompanying drawings, which are briefly described below.

FIG. 1 is a fragmentary perspective view illustrating the interior of a tank and riser pipe retrofitted with a probe suspended from the hanger;

FIG. 2 is an exploded perspective view of the hanger;

FIG. 3 is a fragmentary front elevation view of the hanger with its arms extended;

FIG. 4 is an end view of FIG. 3;

FIG. 5 is a view similar to FIG. 3, showing the arms folded; and

FIG. 6 is an enlarged sectional view taken along line 6-6 in FIG. 3.

DETAILED DESCRIPTION OF THE PREFERRED EMBODIMENTS

This disclosure of the invention is submitted in furtherance of the constitutional purposes of the Patent Laws "to promote the progress of science and useful arts" (Article 1, Section 8).

FIGS. 1-6 illustrate details of a preferred form of a hanger for suspending equipment within a storage tank. The illustrated hanger structure has been specifically designed to suspend liquid level monitoring equipment, such as ultrasonic probes, within the interiors of underground storage tanks that include conventional upright risers for product delivery purposes. Such risers typically extend between the tank interiors and access openings provided at the upper ends of the risers.

The general purpose of the hanger is to vertically hang or suspend equipment within a tank in a manner that mechanically references the elevation of the equipment relative to the interior of the tank. The nature of the equipment that is suspended within a tank by this hanger is not critical to an understanding of the hanger structure.

The hanger includes a supporting rigid member extending longitudinally along the one side of a riser pipe so as to leave the riser pipe clear for its usual intended purposes (such as product delivery). The hanger isolates the position of the equipment suspended within the tank from dimensional changes in the length of the member caused by temperature changes within the riser pipe.

A liquid level monitoring probe 10 is generally shown in FIG. 1. A chain 14 at the top of probe 10 serves to freely suspend it in a vertical orientation within a storage tank 15. The illustrated probe 10 is exemplary of the types of equipment that might be suspended within an underground storage tank by use of the present hanger.

Probe 10 includes an ultrasonic transducer 11 directed toward a series of spaced referenced rings 12. The rings 12 are accurately located along the length of upright supporting rods 13 and are used as reference reflectors during liquid density measurements. Transducer 11 is supplied with a flexible electrical cable 19 through which signals are supplied to external monitoring equipment (not shown). Such probes have proven to be extremely accurate in measuring liquid level changes within a tank.

It is vital that the elevational position of the probe 10 with respect to the interior of the tank be constant, since such comparative measurements must be taken over a substantial period of time in order to detect liquid level changes due to tank leakage. If the elevation of probe 10 within the tank is different each time that measurements are taken, it becomes impossible to reference one measurement to a preceding or subsequent measurement, and intervening leakage or liquid level changes cannot be accurately calculated.

A typical tank 15 utilizing the hanger is generally illustrated in FIG. 1. While this tank is a cylindrical tank positioned on its side, the present hanger can be utilized within any tank configuration, whether buried or aboveground, and whether the tank is upright or on its side.

Tank 15 is provided with a riser pipe 16 extending to a location substantially flush with the ground surface. Riser 16 extends between an upper access opening 17 and a lower end in open communication with the interior of tank 15. It is centered within a surrounding flush manhole 29. Both the access opening 17 and the manhole 29 are normally provided with removable covers (not shown) of conventional design. The lower end of riser 16 can project within the interior of the tank, or can be flush with the interior top wall of the tank, as shown in FIG. 1.

A thin wall drop tube 20 is typically located within riser 16. It is freely suspended from the access opening 17 and extends downwardly to a location within a few inches of the bottom of tank 15. Its purpose is to minimize product evaporation during filling of the tank. It can be temporarily removed during installation of the hanger by simply lifting the drop tube 20 axially through the receiving riser pipe 16.

The hanger comprises a rigid longitudinal member 21 located within the riser pipe 16. This longitudinal member is shown as a C-shaped channel having first (upper) and second (lower) ends. It is adapted to be located within a riser pipe with its first end fixed to the riser pipe at a location just below its access opening. The second end of longitudinal member 21 is adapted to project into the tank.

The first (upper) end of longitudinal member 21 is adapated to be fixed to the riser pipe 16 by means of a special electrical cable mounting bracket 23 extending through a side wall of riser pipe 16 within the surrounding manhole 29 (see FIG. 2). The cable mounting bracket 23 includes a projecting hook 24 located within riser pipe 16, which is adapted to be engaged within a transverse slot 22 formed across the first (upper) end of longitudinal member 21. The longitudinal member 21 hangs vertically from hook 24, which facilitates manual release of the longitudinal member 21 as required for repair or replacement of the suspended equipment. Cable mounting bracket 23 also provides a through aperture for the cable 19 leading to transducer 11 within probe 10.

A crossbar means 25 is adapted to vertically suspend equipment, such as probe 10, within a tank from a location to one side of the longitudinal member 21. The crossbar means 25 is connected to the second (lower) end of longitudinal member 21 and suspends probe 10 at a position transversely offset from the riser pipe 16 from which the longitudinal member 21 is hung.

The crossbar means 25 is shown as two rigid arms 26. Each arm protrudes to opposite sides of its connection to the longitudinal member 21. The longitudinal member 21 and the crossbar means 25 are rigid elements pivotally connected to one another. This pivotal connection permits arms 26 to pivot in an arc relative to the longitudinal member 21 about spaced support axes 35 aligned along the length of the longitudinal member 21.

The hanger further includes support means interconnecting the crossbar means 25 and the longitudinal member 21 for both pivotal and translational movement relative to one another. This support means is shown as a slide 27 mounted to the longitudinal member 21 for motion relative to it in directions parallel to the length of the longitudinal member 21. The crossbar means 25 is pivotally connected to the slide about the pivot support axes 35.

Slide 27 is longitudinally guided for movement parallel to the length of member 21 within a surrounding clamp 28 that is adjustably located on the longitudinal member 21. Clamp 28 can be selectively fixed to longitudinal member 21 by releasable bolt assemblies or other fasteners secured through apertures or slots provided along the lower length of longitudinal member 21.

The hanger also includes biasing means for permitting the crossbar means 25 to be yieldably engaged against downwardly-facing surfaces at the interior of a tank adjacent to a riser pipe within which the first (upper) end of the longitudinal member 21 is fixed. This biasing means is illustrated by two compression springs 31 interposed between the lower end of clamp 28 and the upper end of slide 27 (FIG. 6). Each spring 31 surrounds an interior guide rod 32 that is an extension of slide 27. Guide rods 32 protrude freely through complementary apertures at the lower end of clamp 28. They serve the purpose of maintaining compression springs 31 in parallel alignment so as to constantly urge slide 27 toward the first (upper) end of the longitudinal member 21.

The front wall of clamp 28 is provided with two longitudinal slots 33 through which the respective arms 26 are pivotally connected to the slide 27 at pivot support axes 35. The pivot support axes 35 for the crossbar means 25 are thereby permitted translational movement with the supporting slide 27 under the resilient urging of compression springs 31.

The crossbar means 25 also includes a pair of spaced rigid brackets 36 located at their respective ends. Each bracket is pivotally connected to the arms 26 about corresponding spaced axes 37 in a parallelogram arrangement that maintains the brackets 36 parallel to the longitudinal member 21. Corresponding upper ends of the brackets 36 are shaped as projections 34 adapted to engage the interior top wall of a tank 15. When the hanger is utilized within a dedicated riser pipe that protrudes within the receiving tank, the upper arm 26 can directly abut the lower edges of the riser pipe for dimensional reference purposes.

Attachment means 38 is provided on the crossbar means 25 for vertically suspending equipment from it. The attachment means 38 is transversely offset from the longitudinal member 21 when the crossbar means 25 is in its extended condition. The attachment means 38 is illustrated as a keyhole-shaped opening formed through one of the brackets 36. Chain 14 can be hooked or otherwise attached within this opening to suspend probe 10 or other equipment beneath the bracket at a location to one side of the longitudinal member 21 and supporting riser pipe.

The parallelogram arrangement of arms 26 allows the crossbar means 25 to be moved between a folded condition (FIG. 5) located alongside the longitudinal member 21 and adapted to facilitate its passage through a riser pipe, and an extended condition (FIG. 3) projecting outward from the longitudinal member 21. When the crossbar means 25 is in its extended condition, the suspended probe 10 hanging from the crossbar means is located to one side of the longitudinal member 21 and the riser pipe through which it extends.

A cable guide 41 adjacent to the clamp 28 freely supports the flexible cable 19, which leads between the first (upper) end of longitudinal member 21 and the bracket 36 from which the probe 10 is suspended. A cable clamp 40 is provided adjacent to the attachment means 38 to secure the cable 19 to the supporting bracket 36. The attachment of cable 19 to this bracket permits the cable to be used for manually lifting the crossbar means to the folded condition shown in FIG. 5 in preparation for passage through a riser pipe.

The described hanger and suspended equipment can be assembled outside tank 15 in its folded condition (FIG. 5). The entire assembly, with probe 10 hanging from chain 14, can then be lowered through the open riser pipe 16 after temporarily removing drop tube 20. Manipulation of the hanger within the riser pipe 16 can be facilitated by attaching a manual extension or tool (not shown) to the upper end of longitudinal member 21. Slots 39 are provided for this purpose along the length of the flange across channel 21 (see FIGS. 1 and 2).

Initial assembly of the hanger also involves proper placement of clamp 28 in relation to the known distance between the hook 24 on the cable mounting bracket 23 and the bottom edge of riser 16 or interior tank wall intersected by it. Clamp 28 must be separated from hanger slot 22 by a distance slightly less than this measured and known separation to allow for spring compression.

Longitudinal member 21 can then be manually lowered within the riser pipe 16 to an elevation within tank 15 at which crossbar means 25 is clear to move to its extended condition (FIG. 3). Pivotal movement of the crossbar means 25 is next permitted to occur due to the weight of the suspended equipment. After the crossbar means 25 has been extended transversely, longitudinal member 21 can be lifted to place its upper end on the supporting hook 24.

As the longitudinal member 21 is raised, the projections 34 on the outermost brackets 36 of crossbar means 25 will engage against the interior upper wall surfaces of the tank 15 in opposition to the forces exerted on slide 27 by the compression springs 31. The initial installation of the hanger should be such as to partially compress springs 31 and locate the pivot connections between arms 26 and slide 27 intermediate the lengths of the guiding slots 33 formed through the front wall of clamp 28.

When properly installed, the hanger will mechanically reference the elevation of probe 10 or other equipment within the tank relative to the tank interior and will isolate the position of the equipment from dimensional changes that may occur in the length of the longitudinal member due to temperature changes. Expansion or contraction of the longitudinal member 21 will be compensated by changes in position of slide 27 due to the action of compression springs 31, which will constantly maintain the crossbar means 25 in engagement with a fixed surface within the tank interior. Liquid level readings can thereby be taken over extended periods of time and at different ambient temperatures without introduction of inaccuracies due to variations in the mounting of the probe within the surrounding tank.

The respective transverse locations of the support axes 35 along the respective arms 26 are offset from their centers. It is preferable that there be a substantial difference in the lengths of the arms 26 projecting to each side of the longitudinal member 21. The non-supporting ends of arms 26 are shown as being shorter than their ends that include attachment means 38. This maximizes the lateral spacing between the hanging equipment within tank 15 and the bottom of the riser pipe 16, where turbulence occurs during product delivery. It also facilitates introduction of the hanger within tanks having a riser pipe closely adjacent to one vertical tank wall. To reduce errors due to fluid turbulence, the equipment suspended from the hanger should be located toward the center of the receiving tank.

The channel that comprises the longitudinal member 21 is C-shaped to provide a rigid member for support of the crossbar means 25. The open area within the channel also loosely surrounds the cable 19 to protect it from damage. The slight obstruction within riser pipe 16 that is presented by the channel can be accommodated by longitudinally creasing the thin wall drop tube 20 prior to reinserting it through the riser pipe 16. The described installation of this hanger does not interfere with normal usage of riser pipe 16 for its intended purpose, such as product delivery.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A hanger for suspending equipment within a storage tank that includes an upright riser pipe extending between the interior of the tank and an access opening provided at the upper end of the riser pipe, the hanger comprising:

a longitudinal member having first and second ends, the longitudinal member being adapted to be located within a riser pipe connected to an inner wall of a storage tank having an access opening, the first end of the longitudinal member being fixed to the riser pipe at a location adjacent to the access opening, the second end of the longitudinal member being adapted to project into the tank;

crossbar means connected to the second end of the longitudinal member, the crossbar means being adapted to suspend equipment within a tank from a location to one side of the longitudinal member; and biasing means interposed between the longitudinal member and the crossbar means for permitting the crossbar means to be yieldably engaged against the inner wall adjacent the access opening;

the crossbar means being adapted to suspend equipment within the storage tank at a mechanically referenced position relative to the inner wall adjacent the access opening, the biasing means isolating the position of the equipment within the tank from dimensional changes in the length of the longitudinal member due to temperature changes.

2. The hanger of claim 1 in which the crossbar means comprises an arm protruding to opposite sides of its connection to the second end of the longitudinal member.

3. The hanger of claim 1 wherein the longitudinal member and the crossbar means are rigid elements pivotally connected to one another.

4. The hanger of claim 1, further comprising:

support means interconnecting the crossbar means and the longitudinal member for both pivotal and translational movement relative to one another.

5. A hanger for suspending equipment within a storage tank that includes an upright riser pipe extending between the interior of the tank and an access opening provided at the upper end of the riser pipe, the hanger comprising:

a longitudinal member having first and second ends, the longitudinal member being adapted to be located within a riser pipe connected to an inner wall of a storage tank having an access opening, the first end of the longitudinal member being fixed to the riser pipe at a location adjacent to the access opening, the second end of the longitudinal member being adapted to project into the tank;

crossbar means operably connected to the second end of the longitudinal member for movement between a folded condition located alongside the longitudinal member adapted to facilitate its passage through a riser pipe, and an extended condition projecting transversely outward from the longitudinal member;

attachment means provided on the crossbar means for vertically suspending equipment from it, the attachment means being transversely offset from the longitudinal member when the crossbar means is in its extended condition; and biasing means interposed between the crossbar means and longitudinal member for permitting the expanded crossbar means to be yieldably engaged against the inner wall adjacent the access opening;

the crossbar means being adapted to suspend equipment within the storage tank at a mechanically referenced position relative to the inner wall adjacent the access opening, the biasing means isolating the position of the equipment within the tank from dimensional changes in the length of the longitudinal member due to temperature changes.

6. The hanger of claim 5 wherein the longitudinal member and the crossbar means are rigid elements pivotally connected to one another.

7. A hanger for suspending equipment within a storage tank that includes an upright riser pipe extending between the interior of the tank and an access opening provided at the upper end of the riser pipe, the hanger comprising:

a longitudinal member having first and second ends, the longitudinal member being adapted to be located within a riser pipe connected to an inner wall of a storage tank having an access opening, the first end of the longitudinal member being fixed to the riser pipe at a location adjacent to the access opening, the second end of the longitudinal member being adapted to project into the tank;

crossbar means operably connected to the second end of the longitudinal member for movement between a folded condition located alongside the longitudinal member adapted to facilitate its passage through a riser pipe, and an extended condition projecting transversely outward from the longitudinal member;

attachment means provided on the crossbar means for vertically suspending equipment from it, the attachment means being transversely offset from the longitudinal member when the crossbar means is in its extended condition; and biasing means interposed between the crossbar means and longitudinal member for permitting the expanded crossbar means to be yieldably engaged against the inner wall adjacent the access opening;

the crossbar means being adapted to suspend equipment within the storage tank at a mechanically reference position relative to the inner wall adjacent the access opening, the biasing means isolating the position of the equipment within the tank from dimensional changes in the length of the longitudinal member due to temperature changes; and support means interconnecting the crossbar means and the longitudinal member for both pivotal and translational movement relative to one another.

8. The hanger of claim 7 wherein the support means comprises:

a slide mounted to the longitudinal member for motion relative to it in directions parallel to the length of the longitudinal member; and the crossbar means being pivotally connected to the slide.

9. The hanger of claim 7 wherein the support means comprises:

a clamp adapted to be fixed along the length of the longitudinal member;

a slide mounted to the clamp for motion relative to the longitudinal member in directions parallel to its length; and the biasing means comprising:

a spring operably connected between the clamp and the slide to bias the slide longitudinally toward the first end of the longitudinal member;

the crossbar means being pivotally connected to the slide.

10. A hanger for suspending equipment within a storage tank that includes an upright riser pipe extending between the interior of the tank and an access opening provided at the upper end of the riser pipe, the hanger comprising:

a longitudinal member having first and second ends, the longitudinal member being adapted to be located within a riser pipe connected to an inner wall of a storage tank having an access opening, the first end of the longitudinal member being fixed to the riser pipe at a location adjacent to the access opening, the second end of the longitudinal member being adapted to project into the tank;

crossbar means operably connected to the second end of the longitudinal member for movement between a folded condition located alongside the longitudinal member adapted to facilitate its passage through a riser pipe, and an extended condition projecting transversely outward from the longitudinal member;

attachment means provided on the crossbar means for vertically suspending equipment from it, the attachment means being transversely offset from the longitudinal member when the crossbar means is in its extended condition; and biasing means interposed between the crossbar means and longitudinal member for permitting the expanded crossbar means to be yieldably engaged against the inner wall adjacent the access opening;

the crossbar means being adapted to suspend equipment within the storage tank at a mechanically referenced position relative to the inner wall adjacent the access opening, the biasing means isolating the position of the equipment within the tank from dimensional changes in the length of the longitudinal member due to temperature changes;

wherein the crossbar means comprises at least two arms;

the crossbar means further comprising:

a pair of spaced rigid brackets, each bracket being pivotally connected to the arms about corresponding spaced axes in a parallelogram arrangement.

11. The hanger of claim 10 wherein the arms are pivotally mounted relative to the longitudinal member about individual support axes spaced apart and aligned along the length of the longitudinal member.

12. The hanger of claim 11 wherein the respective transverse locations of the support axes along the respective arms are offset from their centers.

13. The hanger of claim 10 wherein corresponding upper ends of the brackets include projections adapted to engage the inner wall of the tank.

14. A hanger for suspending equipment within a storage tank that includes an upright riser pipe extending between the interior of the tank and an access opening provided at the upper end of the riser pipe, the hanger comprising:

an elongated rigid channel having first and second longitudinal ends, the channel being adapted to be located within a riser pipe anchored to an inner wall of a storage tank having an access opening, the first end of the channel being fixed to the riser pipe at a location adjacent to the access opening, the second end of the channel being adapted to project into the tank;

a clamp adjustably fixed to the channel adjacent to its second end;

a slide mounted to the clamp for translational motion relative to the channel in directions parallel to its length;

spring means operably connected between the clamp and the slide for biasing the slide longitudinally toward the first end of the channel;

a first rigid arm pivotally connected to the slide about a first support axis for movement between a folded condition wherein the arm is located alongside the channel to facilitate its passage through a riser pipe, and an extended condition wherein the first arm projects transversely from the channel; and attachment means on the first arm for vertically suspending equipment from it, the attachment means being transversely offset from the channel when the first arm is in its extended condition;

the first arm being adapted to suspend equipment within the storage tank at a mechanically referenced position relative to the inner wall adjacent the access opening, the spring means maintaining the first arm against the inner wall to isolate the position of the equipment within the tank from dimensional changes in the length of the elongated rigid channel due to temperature changes.

15. The hanger of claim 14, further comprising:

a second arm pivotally connected to the slide about a second support axis adjacent to the first support axis; and a pair of spaced rigid brackets each pivotally connected to the first and second arms about corresponding axes in a parallelogram arrangement.

16. The hanger of claim 14, further comprising:

a second arm pivotally connected to the slide about a second pivot axis adjacent to the first pivot axis; and a pair of spaced rigid brackets each pivotally connected to the first and second arms about corresponding axes in a parallelogram arrangement;

corresponding upper ends of the brackets including projections adapted to engage the inner wall of the tank.

17. In combination with a storage tank including an upright riser pipe extending from the interior of the tank to an access opening at the upper end of the riser pipe:

a longitudinal member located within the riser pipe, a first end of the longitudinal member being anchored to the riser pipe at a location adjacent to its access opening and a second end projecting into the tank;

crossbar means operably connected to the second end of the longitudinal member for movement between a folded condition located alongside the longitudinal member, to facilitate its passage into the tank through the riser pipe, and an extended condition projecting transversely outward from the longitudinal member;

attachment means on the crossbar means for vertically suspending equipment within the tank at a preselected position relative to the crossbar means, the attachment means being transversely offset from the longitudinal member while the crossbar means is in its expanded condition; and biasing means operably interconnected between the crossbar means and longitudinal member for yieldably urging the transversely projecting crossbar means toward the first end of the longitudinal member to hol the crossbar means in engagement against an interior surface within the tank and thereby isolate the equipment suspended within the tank from dimensional changes that occur in the length of the longitudinal member due to temperature changes to maintain the equipment at the preselected position relative to the crossbar means.

18. The apparatus of claim 17, wherein the longitudinal member comprises a C-shaped channel, the apparatus further comprising:

a flexible length of electrical cable extending between the first and second ends of the longitudinal member through the longitudinal recess provided within the C-shaped channel.

* * * * *